United States Patent
Peck et al.

(10) Patent No.: US 6,758,444 B1
(45) Date of Patent: Jul. 6, 2004

(54) MOMENTUM CONTROL SYSTEM AND METHOD

(75) Inventors: Mason Alan Peck, Scottsdale, AR (US); Tristram Tupper Hyde, Severna Park, MD (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/334,202

(22) Filed: Dec. 30, 2002

(51) Int. Cl.[7] ............................................... B64G 1/28
(52) U.S. Cl. ....................................................... 244/165
(58) Field of Search .............................. 244/165, 164, 244/158 R

(56) References Cited

U.S. PATENT DOCUMENTS

| | | | | |
|---|---|---|---|---|
| 3,999,729 | A | * | 12/1976 | Muhfelder et al. |
| 4,071,211 | A | * | 1/1978 | Muhfelder et al. |
| 4,078,748 | A | * | 3/1978 | Sen |
| 5,058,835 | A | * | 10/1991 | Goodzeit et al. |
| 5,279,483 | A | * | 1/1994 | Blancke et al. |
| 5,335,179 | A | * | 8/1994 | Boka et al. |
| 5,754,023 | A | * | 5/1998 | Roston et al. |
| 5,826,829 | A | * | 10/1998 | Holmes |
| 5,931,421 | A | * | 8/1999 | Surauer et al. |
| 6,076,772 | A | * | 6/2000 | Eyerly et al. |
| 6,089,508 | A | * | 7/2000 | Noyola et al. |
| 6,138,953 | A | * | 10/2000 | Noyola et al. |
| 6,305,647 | B1 | * | 10/2001 | Defendini et al. |

* cited by examiner

*Primary Examiner*—Tien Dinh

(57) ABSTRACT

A momentum control system and method is provided that provides attitude control for a vehicle while minimizing the negative effects of the momentum control system. The momentum control system and method include at least one more reaction wheel than the degrees of freedom under control. For example, in a vehicle designed to rotate in all three direction, at least four reaction wheels would be provided. The additional reaction wheel provide an additional control parameter that can be used to minimize the cost of the momentum control system's performance. The cost of the momentum control system that can be minimized includes the effects of vibration, power consumption, and undesirable changes in rotational direction, among others.

20 Claims, 6 Drawing Sheets

MOMENTUM CONTROL SYSTEM AND METHOD

FIELD OF THE INVENTION

This invention generally relates to reaction wheels used to provide attitude control for spacecraft, and more specifically applies to reaction wheel arrays.

BACKGROUND OF THE INVENTION

Reaction wheels are commonly used to provide attitude control for a variety of spacecraft. Reaction wheels typically comprise a rotor, bearings and motor, with a spin direction of the reaction wheel fixed within the vehicle structure. The motor provides the ability to vary the wheel speed of the rotor. As the rotor speed is varied, a momentum exchange occurs and the motor provides a torque on the vehicle about the spin axis In most applications, multiple reaction wheels are used in a reaction wheel array. The multiple reaction wheels in the array are arranged so that their spin axes span three dimensions for three axis control. Arranging the multiple reaction wheels in this way allows the array to apply torque to the vehicle along different axes, generally all three. Torque can be selectively applied to these axes to provide attitude control of the vehicle.

A typically array includes at least three reaction wheels. This number is the minimum that would enable the array to apply torque to the vehicle in any direction. In many applications, arrays include more than three reaction wheels. These additional reaction wheels enhance the array's torque and momentum capacity and/or provide backup in the case of a failure in one of the other reaction wheels.

Imperfect rotation of a reaction wheel's rotor can sometimes cause disturbances. These disturbances, typically in the form of vibrations at harmonics of the spin, notation and precession frequencies, can interfere with the performance of the vehicle. For example, vibration in a satellite may prevent the satellite or its payload from accurately fixing on a desired target.

The vibration and the effect of the vibration on the satellite generally change with the rotational frequency of the rotors. In some frequency ranges the vibrations caused by the rotation of the rotor may be within acceptable limits, while in other frequency ranges the vibrations may exceed acceptable limits. Wheel speeds typically differ among the various wheels in an array, and these speeds change with time. Because the spacecraft dynamics include flexible structures, which respond differently—even resonate—at various frequencies, the array's vibration interacts with the spacecraft dynamics in a way that depends on the wheels' spin speeds. Additionally, the effects of the multiple different rotors may be additive to cause different combinations of frequency ranges to be problematic.

In addition to causing disturbances, the operation of the reaction wheel array can have other frequency-dependent costs. For example, the energy required to effect attitude control of a vehicle can depend upon the combination of rotational frequencies used because the electromagnetic power required to torque a wheel increases with its spin speed. Another example is the thermal effect of operating a wheel at high speed: without explicit attention, wheel speeds can be needlessly high, introducing unwanted and unnecessary heat. Again, these costs can be acceptable in some situations and unacceptable in other.

Thus, what is needed is an improved system and method for operation of reaction wheels that minimizes the cost of operating these wheels, including minimizing the effects of frequency induced disturbances on he vehicle.

BRIEF SUMMARY OF THE INVENTION

The present invention provides a momentum control system and method that provides attitude control for a vehicle while minimizing the negative effects of the momentum control system. The momentum control system includes a plurality of reaction wheels, with each reaction wheel including a rotor that rotates about an axis. The momentum control system varies the rotational speed of the rotor to provide torque to the vehicle, effecting an attitude or orientation change in the vehicle.

The momentum control system and method include at least one more reaction wheel than the degrees of freedom under control. For example, in a vehicle designed to rotate in all three directions, at least four reaction wheels would be provided. The additional reaction wheel provides an additional control parameter that can be used to minimize the cost of the momentum control system's performance. The cost of the momentum control system that can be minimized includes the effects of vibration, power consumption, and undesirable changes in rotational direction, among others.

The momentum control system and method minimizes the cost of the system by selecting rotational frequency combinations for the reaction wheels that reduce the negative effects of the wheels while still providing the desired torque to the vehicle. Stated another way, the system and method uses the flexibility provided by the additional reaction wheel and actively selects and uses rotational frequency combinations that provide the required torque while also avoiding, where possible, rotational frequencies that cause excessive cost to the system.

The additional reaction wheels used to provide the rotational frequency flexibility can comprise additional reaction wheels added for this purpose or the use of reaction wheels that also serve as backups in the case of failure.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a momentum control system and method that provides attitude control for a vehicle while minimizing the negative effects of the momentum control system. The momentum control system includes a plurality of reaction wheels, with each reaction wheel including a rotor that rotates about an axis. The momentum control system varies the rotational speed of the rotor to provide torque to the vehicle, effecting an attitude or orientation change in the vehicle.

Figure 1:
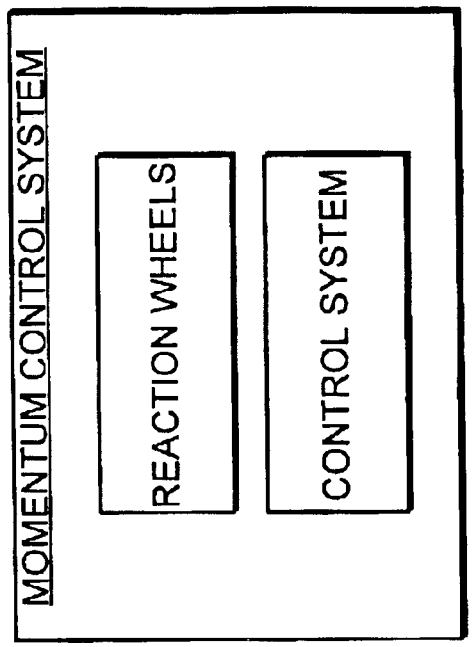
FIG. 1 is a schematic view a momentum control system.

Turning now to FIG. 1, a schematic view of a momentum control system is illustrated. The momentum control system includes a plurality of reaction wheels and a control system. The control system controls the rotational speed and direction of the reaction wheels to impart desired amounts of torque to the vehicle. The plurality of reaction wheels includes at least one more reaction wheel than the degrees of freedom under control. For example, in a vehicle designed to rotate in all three directions, such as a satellite, at least four reaction wheels would be provided. The additional reaction wheel provides an additional control parameter that can be used to minimize the cost of the momentum control system's performance. The cost of the momentum control system that can be minimized includes the effects of vibration, power consumption, and undesirable changes in rotational direction, among others.

In accordance with the embodiments of the invention, the control system controls the rotational speed and direction of the reaction wheel in a way that reduces the negative effects of the wheels while still providing the needed torque to the vehicle. Specifically, the control system utilizes the flexibility of the additional control parameter provided by the additional reaction wheel and actively selects and uses rotational frequency combinations that provide the required attitude control while also avoiding where possible rotational frequencies that cause excessive cost to the system.

As stated above, the plurality of reaction wheels comprises at least one more reaction wheel then needed for the degrees of freedom under control. For example, in a system with only direction of control, the plurality of wheels would comprise at least two wheels, with one wheel being the minimum number needed to effectuate movement in the direction of control and at least one additional wheel used to provide the additional control parameters. In another example, in a system with three directions of control, such as a satellite where the reaction wheels are used to control the attitude of the satellite, the plurality of reaction wheels would comprise at least four wheels. In this example, three wheels are the minimum required to control the attitude of the satellite in all three directions and the at least one additional wheels provide the additional control parameters.

The additional reaction wheels used in the embodiments of the invention can be wheels that are added for this specific purpose. Additionally, the control system and method can be implemented with wheels that primarily serve to backup and supplement the primary wheels.

The reaction wheels can comprise any suitable reaction wheel design and structure. Examples of suitable reaction wheels include the HR0610 and HR14 available from Honeywell International, Inc. Other examples of reaction wheel designs can be found at U.S. Pat. No 5,873,285 issued to Barnes and assigned to Honeywell International, Inc. Of course, any other suitable reaction wheel design and structure that can be used to impart torque to a vehicle could also be implemented as an embodiment of the current invention.

Figure 2:
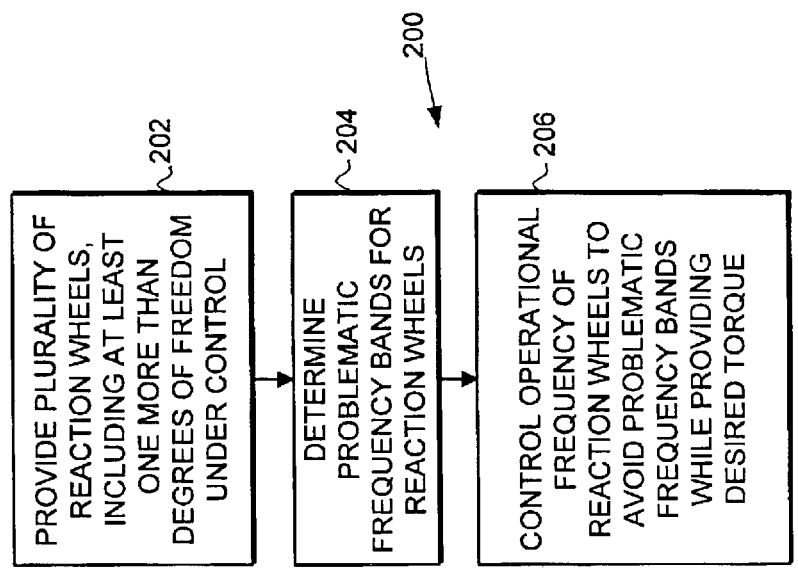
FIG. 2 is a flow diagram of a method a method of momentum control.

Turning now to FIG. 2, a method of momentum control is illustrated. The method 200 imparts a torque for controlling the attitude of a vehicle while minimizing negative effects. The first step 202 is to provide a plurality of reaction, including at least one more reaction wheel than the degrees of freedom under control. Again, in the example of system with three degrees of freedom, this would include providing at least four reaction wheels.

The next step 204 is to determine problematic frequency bands. These problematic frequency bands comprise the bands in which the rotation of the reaction wheel induces some negative effect onto the vehicle. These frequency bands would typically be determined for each individual reaction wheel, and in many circumstances different reaction wheels would have different problematic frequency bands. Additionally, in some cases combinations of frequencies may be problematic where those frequencies individually may not be.

The step of determining problematic frequency bands can comprise the generation of a cost function that describes many different negative effects and weights those effects according to their relative priority. In this case, the determination of problematic frequency bands could be a relatively complex undertaking where the multitude of possible effects at each frequency is calculated and added ordered to a complex formula. In other cases, the determination of problematic frequency bands can be relatively straightforward, such as an analysis to determine what rotational frequencies are likely to cause unacceptable vibrations throughout the system.

the problematic frequencies determined, the next step 206 is to control the operational frequency of the reaction wheels to avoid problematic frequency bands while providing the desired torque on the vehicle. This step utilizes the flexibility of the additional control parameter provided by the additional reaction wheel. The additional reaction wheel allows the system to actively select and utilize rotational frequency combinations that provide the desired torque to the vehicle while also avoiding problematic frequency bands that impose excessive costs on the system.

One way to describe the additional control parameters provided by the extra reaction wheels is with the concept of null space. Here, the null space is a mathematical subspace that is complementary (or orthogonal) to the three-dimensional space, the so-called range space, that matters for torque actuation. By this definition, changing wheel speeds in a way that influences the array's torque output occurs within the range space. Similarly, changing wheel speeds in a way that has no influence on the array's torque output occurs within the null space. For example, consider an array consisting of only two coaxial, or parallel, wheels. Spinning up either one of the wheels, or spinning both in the same direction, represents a torque that can be used to rotate a vehicle. However, spinning one wheel up with some torque and spinning the other one down with equal torque (but opposite in direction) makes both torques cancel; the result is that the sum of the wheels' torque, or the array torque, is zero. In this example, the range space consists of wheel torques and speeds in the same direction. The null space consists of torques and speeds that cancel one another. Thus, if the array has a null space, it is possible to achieve a desired array momentum and torque with many (perhaps infinite) combinations of individual wheel momentum and torque. The system and method use a generalization of this simple two-wheel example, allowing for an arbitrarily large null space associated with arbitrarily many extra wheels. For example, there is a single minimum-speed solution, in which there is no null-space activity. That solution is the commonly adopted one. Using this invention would result in higher speeds among all the wheels than strictly necessary to achieve the desired torque and momentum output, but the combination of speeds is optimal in that it minimizes vibration and/or some other parameter of interest.

Turning now to FIGS. 3–10, an example of how the momentum control system and method can be used will be illustrated, along with several associated parameters. In the example of FIGS. 3–10, the behavior of a momentum control system for a system with three degrees of freedom and seven reaction wheels are illustrated. In FIGS. 3–6, the behavior of the momentum control system is illustrated without the application of the invention. Specifically, in FIGS. 3–6 the system is shown where the additional control parameters provided by the additional reaction wheels are not used to minimize the cost function. In FIGS. 7–10, the behavior of the same system is illustrated when the additional control parameters are used to reduce the cost of the system.

Figure 4:
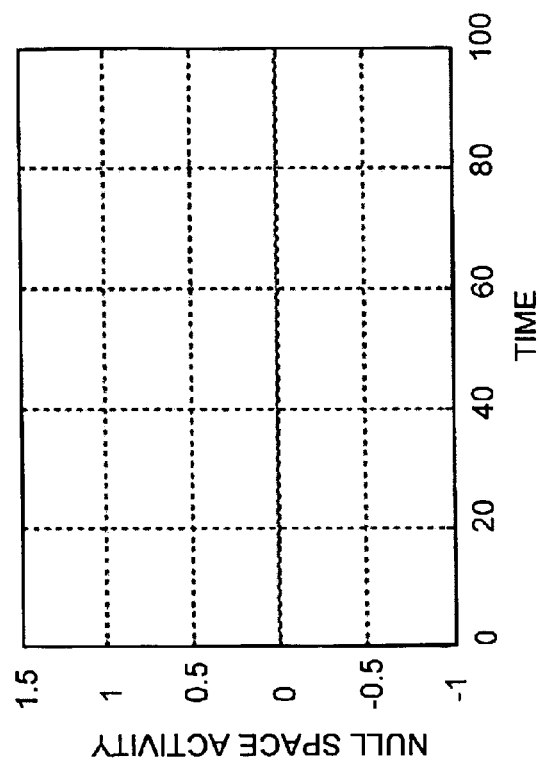
FIGS. 3–10 are charts illustrated associated parameters of a momentum control system and method.
Figure 3:
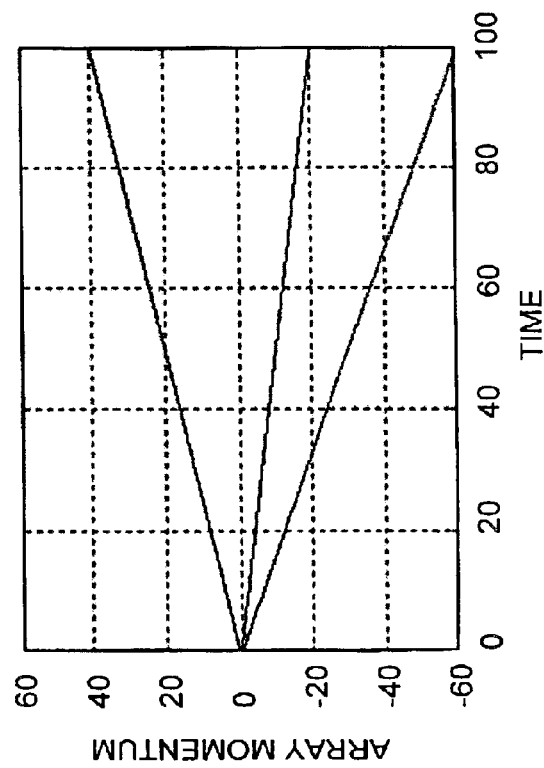

FIG. 3 illustrates an exemplary array momentum requirement needed to provide a desired torque to a vehicle. The required array momentum is shown for each of the three dimensions, with each line representing a different dimension. The required array momentum is illustrated as a function of time, showing an example where the momentum required from the reaction wheels changes over time. Turning now to FIG. 4, the null space activity during this example is illustrated. Again, the null space activity comprises the movement within variable space provided by the additional control parameters made available by the additional reaction wheels. In current standard practice, the null space activity has is held constant or forced to be zero.

Figure 5:
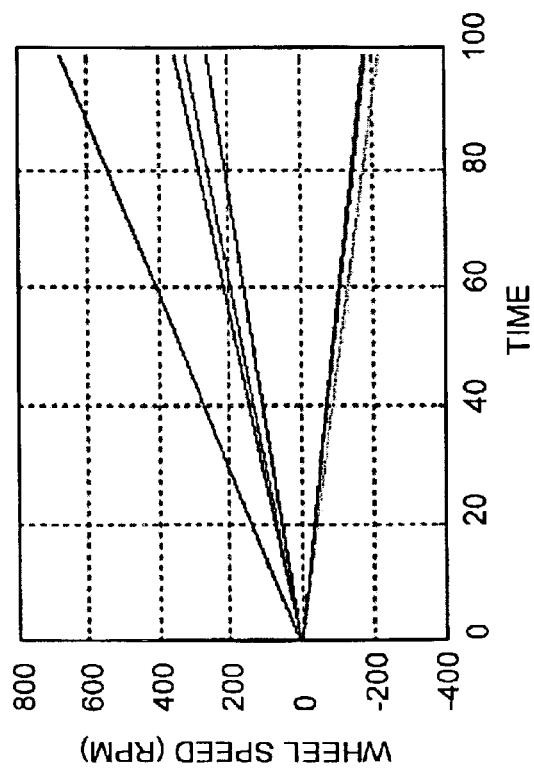

Turning now to FIG. 5, a chart of wheel speeds needed to provide the desired torque with the null space held constant is illustrated Again, in this example, seven reaction wheels are used to provide the needed torque. FIG. 5 illustrates the wheel speeded needed from each of these seven reaction wheels to produce the array momentum illustrated in FIG. 3, with the null space held constant as in FIG. 4 As the required array momentum changes, the wheel speeds used to generate the momentum changes. As shown each of the seven wheels imparts a portion of the required torque on the vehicle.

Figure 6:
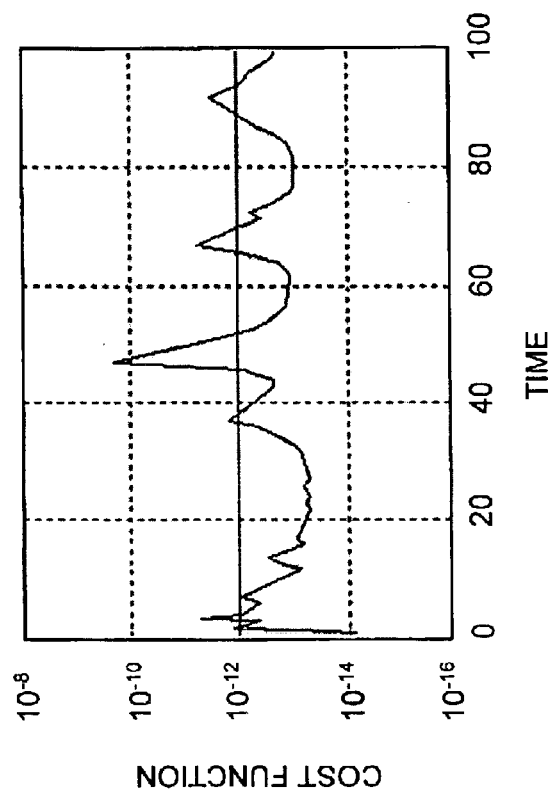

Turning now to FIG. 6, a chart of an example cost function over time is illustrated. The exemplary cost function illustrated in FIG. 6 is meant to be merely an example of how a poor cost can result from the reaction wheels rotation at certain frequencies. The cost function here could be any negative effect, including vibration, energy consumed, etc. As the wheel speeds change to provide the required torque (FIG. 5) they invariably cross problematic frequency bands. While the reaction wheels operate within these bands, the cost function rises dramatically. This represents the negative effects that arise from the operation of the reaction wheels at these speeds.

Turning now to FIGS. 7–10, the behavior of the same system is illustrated when the invention is implemented so additional control parameters are used to reduce the cost of the system.

Figure 8:
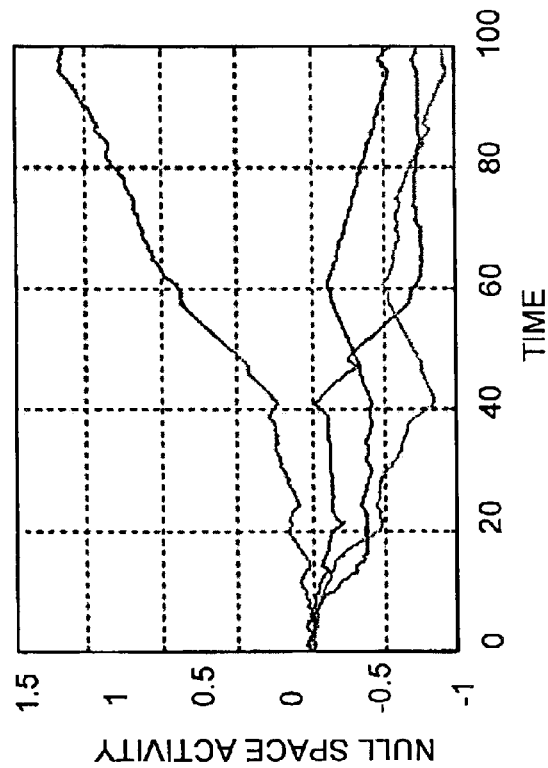
Figure 7:
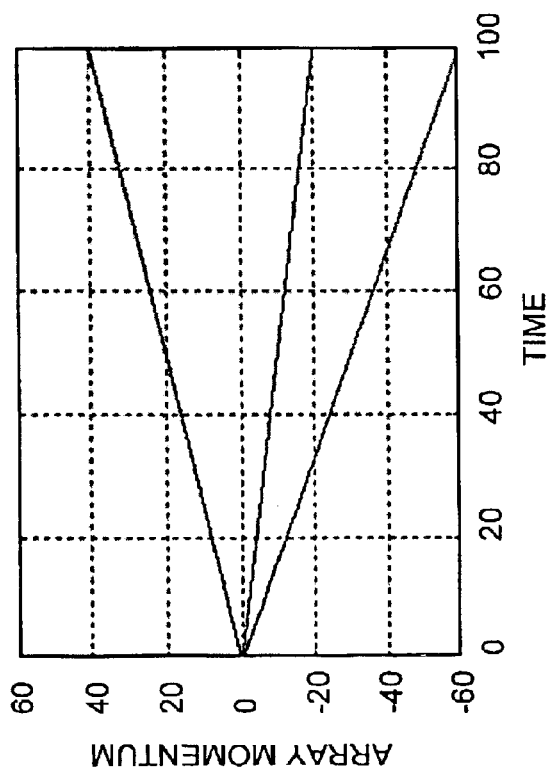

FIG. 7 again illustrates an exemplary array momentum requirement needed to provide a desired torque to a vehicle. For purposes of comparison, the required array momentum is identical to that illustrated in FIG. 3. Turning now to FIG. 8, the null space activity during this example is illustrated. In accordance with the embodiments of the invention, the control system and method moves within the null space to reduce the negative effects of the wheels while still providing the needed torque to the vehicle. Instead of holding the parameters within the null space constant, the system and method use the flexibility provided by the null space to actively select rotational frequency combinations that provide the required torque while also avoiding, where possible, rotational frequencies that cause excessive cost to the system. In FIG. 8, this is illustrated by showing how the four additional degrees of freedom within the null space are manipulated to avoid problematic frequency bands.

Figure 9:
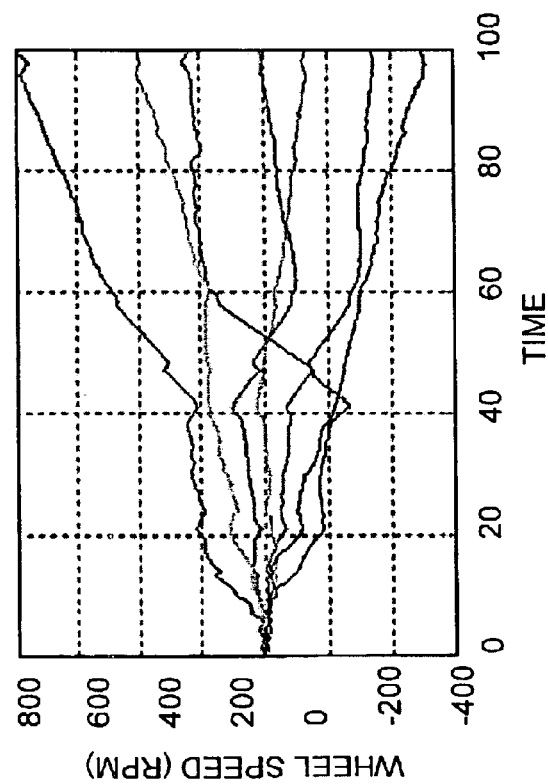

Turning now to FIG. 9, a chart of wheel speeds needed to provide the desired torque with the null space manipulated is illustrated. Again, in this example, seven reaction wheels are used to provide the needed torque. FIG. 9 illustrates the wheel speeded needed from each of these seven reaction wheels to produce the array momentum illustrated in FIG. 7, with the changes in the null space occurring as illustrated in FIG. 8 As the required array momentum changes, the wheel speeds used to generate the momentum changes. As shown in FIG. 9 each of the seven wheels imparts a portion of the required torque on the vehicle. The additional variations in the wheel speeds illustrated in FIG. 9 (when compared to the wheel speeds illustrated in FIG. 5) occur as the system uses the additional component parameters provided by the extra reaction wheels to effect changes in the null space and avoid problematic frequency bands.

Figure 10:
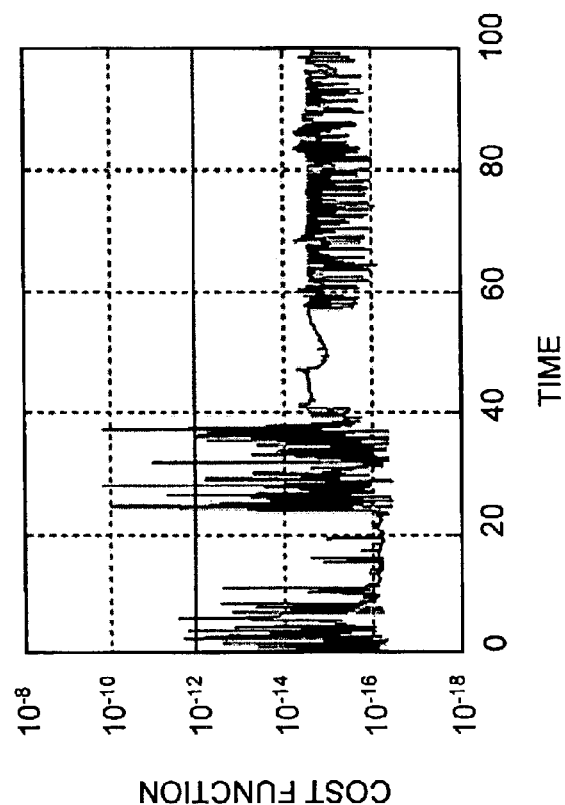

Turning now to FIG. 10, a chart of the example cost function over time is again illustrated. FIG. 10 illustrates the result of the system's use of the additional control parameters to avoid problematic frequency bands and reduce the cost of the momentum system. It should be noted that while the cost function does occasionally rise to high levels, it quickly drops as the system actively moves reaction wheels from problematic frequency bands. Thus, the system is able, wherever possible, to reduce the negative effects represented by the cost function.

There are many different ways in which the system and method can be implemented to reduce the cost of the reaction wheels. Typically, the specific implementation would depend upon the application for which it is being provided, as different applications have different operational requirements. In general it general it is desirable to create a cost function that accurate balances the various negative effects associated with rotational frequency bands. For example, the cost function can focus exclusively on frequency dependent vibrations in applications where vibrations interfere with the primary purpose of the vehicle. In other applications, the cost function can also take into account issues such as energy consumption and avoidance of low or zero speed conditions. The weighting of these various factors would generally depend upon their relative importance in the system.

There are also many different methods that can be used to evaluate the cost function and to select operational frequencies that reduce the cost function. For example, the system can be designed to keep the system operating at frequencies that keep the cost function below a certain value, and to transition away from frequencies that cause the cost function to rise above this value as quickly as possible.

There are several different ways in which the system can be designed to respond to a cost function that exceeds a desired value. For example, the system can be designed to move to the closest available frequency combination that reduces the cost function below the desired value. Another approach would be to actively seek out frequency combinations that minimize the cost function. These approaches can be further refined by taking into account the power, speed, and energy penalty that arises from rotational frequency changes. Finally, the system could be designed to take into account future torque requirements when selecting rotational frequencies. In this example, the system may temporarily accept higher costs when an analysis determines that future costs will be reduced by transitions in that manner.

In addition to actively moving the system to rotational frequencies that bring the cost below a determined value, the system can also be designed, to move within the null space even when the cost function is at acceptable levels. Again, this can take the form of actively seeking local preferred minimums in the cost function, while taking into account power, speed and energy issues. The system can also be designed to seek out non-local minimum where the reduction in cost will outweigh any disadvantage to these frequency changes. Again, the system may temporarily accept higher costs when an analysis determines that future costs will be reduced by transitions in that manner.

The preferred analysis techniques used to evaluate the cost function and select operational frequencies would depend upon the number of additional control parameters available. For example, in a system with only one additional reaction wheel the available options would be relatively limited and relatively simple analysis sufficient In a multidimensional case, with multiple additional reaction wheels providing multiple additional control parameters, the null space contains more than one degree of freedom. The cost function could then be implemented as a positive definite (e.g. quadratic) function in multiaxis performance measures, such as components of predicted vibration disturbance at reference points on a spacecraft payload.

The present invention thus provides a momentum control system and method that provides attitude control for a vehicle while minimizing the negative effects of the momentum control system. The momentum control system and method include at least one more reaction wheel than the degrees of freedom under control. For example, in a vehicle designed to rotate in all three directions, at least four reaction wheels would be provided. The additional reaction wheel provides an additional control parameter that can be used to minimize the cost of the momentum control system's performance. The cost of the momentum control system that can be minimized includes the effects of vibration, power consumption, and undesirable changes in rotational direction, among others.

The momentum control system and method minimizes the cost of the system by selecting rotational frequency combinations for the reaction wheels that reduce the negative effects of the wheels while still providing the desired torque to the vehicle. Stated another way, the system and method uses the flexibility provided by the additional reaction wheel and actively selects and uses rotational frequency combinations that provide the required torque while also avoiding where possible rotational frequencies that cause excessive cost to the system.

The embodiments and examples set forth herein were presented in order to best explain the present invention and its particular application and to thereby enable those skilled in the art to make and use the invention. However; those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A momentum control system, the momentum control system comprising:
   a) a plurality of reaction wheels, the plurality of reaction wheels including at least one more reaction wheel then degrees of freedom under control of the momentum control system, each of the plurality of reaction wheels including a rotor controllably rotating about an axis;
   b) a control system, the control system selecting rotational frequencies of the rotors in the plurality of reaction wheels to reduce a cost function associated with the rotational frequencies while controllably imparting a desired torque on a vehicle, wherein the cost function numerically describes a cost of vibration imparted to the vehicle by weighting negative effects of a plurality of problematic frequency bands.

2. The momentum control system of claim 1 wherein the cost function weights the negative effects of vibrations by focusing on frequencies where vibrations interfere with a primary purpose of the vehicle.

3. The momentum control system of claim 1 wherein the plurality of reaction wheels comprises at least four reaction wheels, and wherein the degrees of freedom under control comprise three degrees of freedom.

4. The momentum control system of claim 1 wherein the control system selects rotational frequencies of the rotors in the plurality of reaction wheels to reduce a cost function by minimizing the cost function while controllably imparting the desired torque on a vehicle.

5. The momentum control system of claim 1 wherein the control system selects rotational frequencies of the rotors in the plurality or reaction wheels to reduce the cost function below a desired level when possible while controllably imparting the desired torque on a vehicle.

6. The momentum control system of claim 1 wherein the control system selects rotational frequencies of the rotors in the plurality of reaction wheels to reduce a cost function by analyzing present and future torque requirements and cost requirements and selecting rotational frequencies that reduce the cost function in light of the present and future torque requirements.

7. The momentum control system of claim 1 wherein the vehicle comprises a space satellite.

8. The momentum control system of claim 1 wherein the cost function further numerically describes a cost of energy consumed by the plurality of reaction wheels by weighting the energy consumed at different frequency bands.

9. A momentum control system, the momentum control system comprising:
   a) at least four reaction wheels, each of the at least four reaction wheel reaction wheels including a rotor controllably rotating about an axis; and
   b) a control system, the control system selecting rotational frequencies of he rotors in the at least four reaction wheels to reduce cost function associated with the rotational frequencies while controllably impairing a desired torque on a vehicle wherein the cost function numerically describes a cost of vibration imparted to the vehicle my weighting negative effects of a plurality of problematic frequency bands, and wherein the cost function further numerically describes a cost of energy consumed by the plurality of reaction wheels by weighting the energy consumed at different frequency bands, and wherein the control system reduces the cost function by selecting rotational frequencies that minimize the cost function.

10. The momentum control system of claim 9 wherein the vehicle comprises a satellite.

11. The momentum control system of claim 9 wherein the cost function further numerically describes a cost of zero conditions.

12. The momentum control system of claim 9 wherein the cost function weights the negative effects of vibrations by focusing on frequencies where vibrations interfere with a primary purpose of the vehicle.

13. A method of reducing the cost effect in a momentum control system, the method comprising the steps of:

a) providing a plurality of reaction wheels, the plurality of reaction wheels including at least one more reaction wheel then degrees of freedom under control of the momentum control system, each of the plurality of reaction wheels including a rotor controllably rotating about an axis; and b) selecting rotational frequencies of the rotors in the plurality of reaction wheels to reduce a cost function associated with the rotational frequencies while controllably imparting a desired torque on a vehicle, wherein the cost function numerically describes a cost of vibration imparted to the vehicle my weighting negative effects of a plurality of problematic frequency bands.

14. Method of claim 13 wherein the wherein the cost function weights the negative effects of vibrations by focusing on frequencies where vibrations interfere with a primary purpose of the vehicle.

15. The method of claim 13 wherein the plurality of reaction wheels comprises at least four reaction wheels, and wherein the degrees of freedom under control comprise three degrees.

16. The method of claim 13 wherein the step of selecting rotational frequencies of the rotors in the plurality of reaction wheels to reduce a cost function comprises selecting rotational frequencies to minimize the cost function while controllably imparting the desired torque on a vehicle.

17. The method of claim 13 wherein the stop of selecting rotational frequencies of the rotors in the plurality of reaction wheels to reduce a cost function comprises selecting rotational frequencies to reduce the cost function below a desired level when possible while controllably imparting the desired torque on a vehicle.

18. The method of claim 13 wherein the step of selecting rotational frequencies of the rotors in the plurality of reaction wheels to reduce a cost function comprising analyzing present and future torque requirements and cost requirements and selecting rotational frequencies that reduce the cost function in light of the present and future torque requirements.

19. The method of claim 13 wherein the vehicle comprises a space satellite.

20. The method of claim 13 wherein the cost function further numerically describes a cost of energy consumed by the plurality of reaction wheels by weighting the energy consumed at different frequency bands.

* * * * *